United States Patent [19]
Ohno et al.

[11] Patent Number: 4,939,717
[45] Date of Patent: Jul. 3, 1990

[54] METHOD AND APPARATUS FOR ERASING AND RECORDING INFORMATION USING THREE POWER LEVELS

[75] Inventors: Eiji Ohno, Osaka; Kenichi Nishiuchi, Moriguchi; Noboru Yamada, Hirakata, all of Japan

[73] Assignee: Matsushita Electric Industrial Co., Ltd., Kadoma, Japan

[21] Appl. No.: 113,105

[22] Filed: Oct. 27, 1987

[30] Foreign Application Priority Data

Oct. 31, 1986 [JP] Japan ............................ 61-261263
Nov. 4, 1986 [JP] Japan ............................ 61-262189

[51] Int. Cl.$^5$ ............................................ G11B 7/125
[52] U.S. Cl. .................................. 369/116; 369/275.2; 369/275
[58] Field of Search ............... 369/13, 100, 111, 116, 369/122, 275, 110; 346/76 L, 77 E, 135.1; 360/116; 365/215, 113, 126

[56] References Cited

U.S. PATENT DOCUMENTS

| | | | |
|---|---|---|---|
| 4,320,489 | 3/1982 | Crandall et al. | 369/275 |
| 4,403,318 | 9/1983 | Nagashima et al. | 369/100 |
| 4,472,748 | 9/1984 | Kato et al. | 369/111 |
| 4,527,173 | 7/1985 | Gupta et al. | 369/100 |
| 4,569,881 | 2/1986 | Freese et al. | 369/13 |
| 4,574,366 | 3/1986 | Potember et al. | 369/100 |
| 4,639,907 | 1/1987 | Aoki et al. | 369/100 |
| 4,656,079 | 4/1987 | Yamada et al. | 369/100 |
| 4,679,184 | 7/1987 | Yoshida et al. | 369/122 |
| 4,710,911 | 12/1987 | Yamada et al. | 369/100 |
| 4,712,207 | 12/1987 | Reno | 369/100 |

FOREIGN PATENT DOCUMENTS

| | | |
|---|---|---|
| 3601265 | 7/1986 | Fed. Rep. of Germany . |
| 56-145530 | 11/1981 | Japan . |
| 56-145535 | 12/1981 | Japan . |
| 60-35303 | 2/1985 | Japan ................................ 369/100 |

OTHER PUBLICATIONS

English Translation of sho 56-145530.
Proceedings of SPIE vol. 420 (1983), pp. 173-177.

Primary Examiner—Donald McElheny, Jr.
Attorney, Agent, or Firm—Cushman, Darby & Cushman

[57] ABSTRACT

In a single beam overwrite method, wherein optical recording medium having thin recording film capable of reversible change of phase by irradiating different level laser lights, etc., the laser light is modulated to have three energy levels, i.e., a recording power level, an erasing power level and a very short time of cooling power level which is provided immediately after the recording power level.

15 Claims, 8 Drawing Sheets

METHOD AND APPARATUS FOR ERASING AND RECORDING INFORMATION USING THREE POWER LEVELS

FIELD OF THE INVENTION AND RELATED ART STATEMENT

1. Field of the Invention

This invention relates to a method for optical information recording for recording, reproducing and erasing an optical information at high speed and high density on an optical information recording member, such as optical disk, by using laser light, etc.

2. Related Art Statement

The techniques for recording and reproducing information at a high density utilizing laser light have been well known. This technique is applied on a document filing system, a static image filing system, etc. Applications to rewritable type recording systems are reported.

One of this rewritable type recording systems is a system of phase change type optical disk, which utilizes phase change of Te compound, Se compound etc. between amorphous and crystal (amorphous-crystal phase change) or utilizes a phase change between crystal and crystal (crystal-crystal phase change) which phase change is caused by volume differentials between different crystal structures.

In the system utilizing the amorphous-crystal phase change a complex refractive index consisting of refractive index n and extinction coefficient k is reduced (whitened), by irradiating strong and short pulse light for raising temperature of the irradiated part followed by rapid quenching of the irradiated part to change it to amorphous phase. The complex refractive index consisting of refractive index n and extinction coefficient k is increased (blackened) by irradiating weak and long pulse light for making the crystal phase. Recording status and erased status of signal corresponds to small complex refractive index phase and large complex refractive index phase, respectively. The small and large complex refractive index phases are detected by reflectivity difference therebetween.

In the system utilizing the crystal-crystal phase change between the crystal structures are different between those rapidly cooled after heating and slowly cooled after heating. The crystal structural change causes a volume change and this system utilizes such volume change.

By the phase change type optical disk, it can be achieved to record new signal simultaneously with erasing the previously recorded signal (overwrite method).

For such an overwrite method, New Optical Erasable Medium using Tellurium Suboxide Thin Film", Proceedings of the SPIE, vol. 420, p173–177 (1983) proposed to form plural beam spots on signal recording track of optical disk by providing plural laser diodes in optical head to record a new signal by a following beam spot simultaneously with erasing the previously recorded signal by a foregoing beam spot. Because the foregoing erasing beam makes crystal phases by slow heating and slow cooling the recording film, its beam spot is designed in elliptic shape having major axis in the track direction, thus making the irradiation time of the laser light on the same point longer than that using circle beam spot.

Figure 3A:
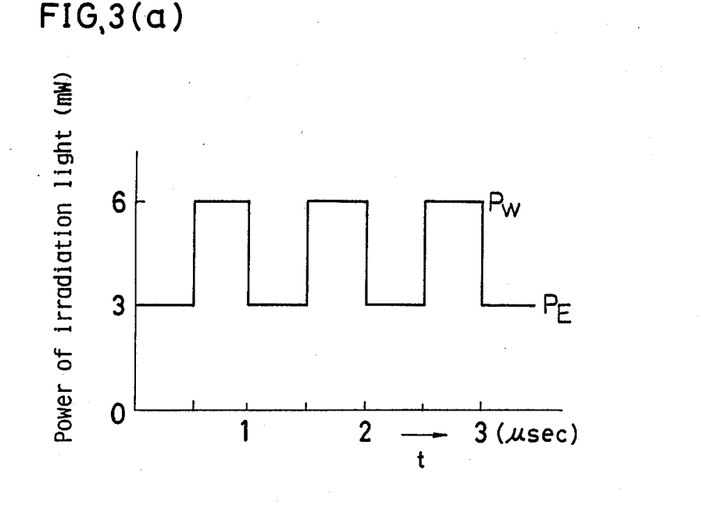
FIG. 3(a) is a wave form chart of output of laser diode used in the prior art.

Japanese published unexamined patent application sho 56-145530 proposed a single beam overwrite method, wherein a single laser spot erases the previously recorded signal and simultaneously records a new signal by modulating the laser light to have two power levels, i.e., recording power level PW and erasing power level PE (PW > PE) as shown in FIG. 3. In such method, the recording film having high speed crystallization characteristic is used.

The above-mentioned two overwrite methods using optical disk of phase change type have difficulties as follows:

In the method of providing plural laser diodes, high optical precision is necessary, because the plural laser spots should be formed on the same track simultaneously, and must be accurately adjust tracking. Therefore, the method has problem in mass-production. Further, since respective laser diodes must be control separately, the system becomes complex. Furthermore, use of plural expensive laser diodes cause to render the system expensive.

On the contrary, the single beam overwrite method has no such difficulties, since there is no necessity of high optical precision or complex system.

However, in such method, since it is necessary to erase the previous recorded signal during passing of erasing spot, the recording film having high speed of crystallization from amorphous phase is necessary. For making amorphous phase in the recording film having the high speed of crystallization, fast cooling after melting is necessary. On the other hand, however, in such method the fast cooling for making amorphous phase is difficult to obtain, since high power erasing beam is irradiated even after irradiating of the recording beam. Therefore, in some cases, large reproducing signal fails to be produced, because the recording bit (mark) is likely to become small or the complex refractive index of recording bit is likely to become larger than that of amorphous phase owing to inclusion of microcrystal in the recording bit and thus, difference of refractive index between the crystal phase and the recording bit becomes small.

When small erasing power level PE is intended to be used for fast cooling, the previously recorded signal is not always perfectly erased, and residual signal is likely to be remained. Therefore, appropriate setting of the two power levels PW and PE is difficult.

Such difficulties that obtained reproduced signal is small and that the residual signal is remained are asserted also in the method utilizing the phase change between different crystals as signal.

OBJECT AND SUMMARY OF THE INVENTION

It is an object of the invention to provide an improved single beam overwrite method and to provide an improved recording method wherein large amplitude of reproduced signal can be obtained without complex system structure.

The method for optical information recording in accordance with the present invention, wherein new signal is recorded simultaneously with erasing old signal by using single laser beam on optical information recording member having thin recording film capable of reversibly changeable between two optically distinguishable phases, and power level of laser is modulated in a recording power level, an erasing power level and a low power level which is lower than the recording and the erasing power level and provided instantaneously after the recording power level.

By using the irradiation light modulated in three power levels for the single beam overwrite method in accordance with the present invention, the irradiation power becomes small instantaneously after recording light irradiated and thus the parts which are irradiated by recording light can be cooled quickly. Therefore, large amorphous area can be formed or large difference of complex refractive indexes can be obtained, since the microcrystals are hardly included in the recording part, and the complex refractive index of recording part becomes small. Therefore, large reproduced signal is obtainable.

Furthermore, the optical head and other system structure can be made simple and cost of the system can be reduced because the overwriting is carried out by a single laser, in the present invention.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Referring now to the drawings in detail, the present invention is described hereafter.

Figure 2A:
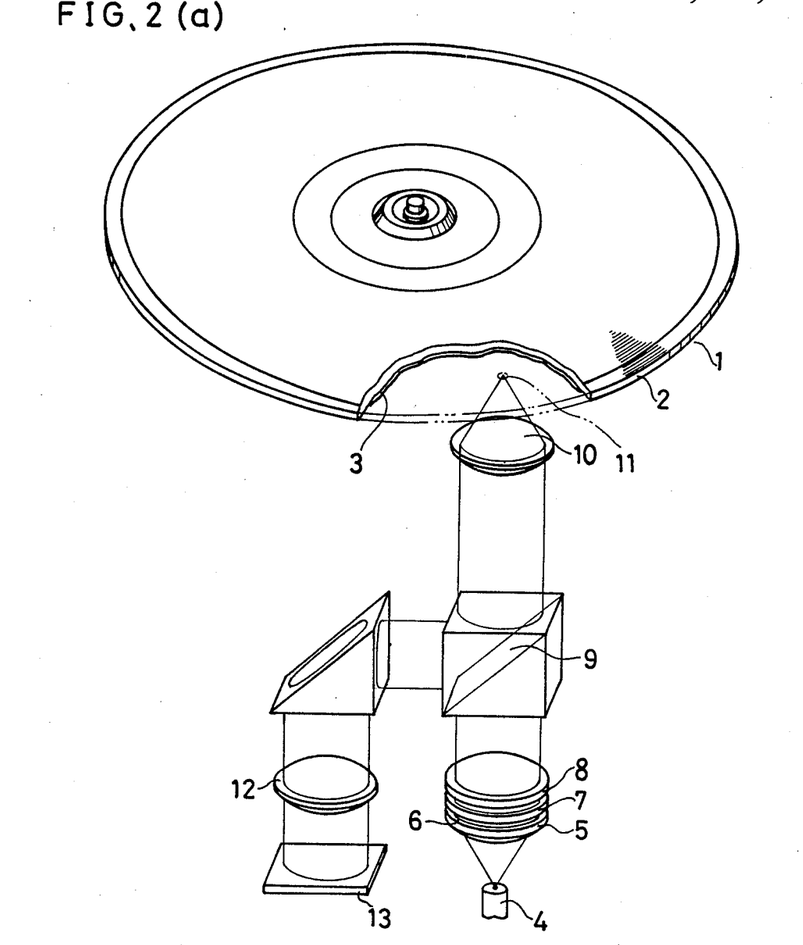
FIG. 2(a) is a figure for showing the optical information recording method in accordance with the present invention.

FIG. 2(a) shows an embodiment of the method for optical information recording. An optical disk 1 has a substrate 2 whereon a recording thin film 3 is provided. As the material of the substrate 2, a resin substrate, such as the polymethylmetaacrylate (PMMA) polycarbonate (PC) or glass substrate can be used. As the material of the recording thin film 3 for recording signal by utilizing a phase change between crystal and amorphous by light irradiation, a thin film consisting of Te compound or Se compound or a thin film having $TeO_x$ $(0<x<2)$ which is mixture of Te and $TeO_2$, as host material can be used. Because in such recording thin films for erasing (crystallization) circular shaped beam spot same as recording beam spot should be used, large crystallization speed is necessary. Therefore, the thin film preferable comprises Te as host material and contains at least one of Sn, Ge, In, Bi, Se, S, Sb, Au, Pd, Pb as additive, or comprises $TeO_x$ as host material and contains at least one of Sn, Ge, In, Bi, Se, S, Sb, Au, Pd, Pb as additive.

In SbSe compound is suitable for material that has crystal-crystal change.

In this embodiment, a laser diode 4 is used as light source. Light of 830 nm wavelength output from the laser diode 4 becomes parallel light 6 by a lens 5. The parallel light 6 is formed to have a circular cross-section by a second lens 7 and is made in to parallel light again by a third lens 8. The resultant parallel light is focussed into a spot 11 of approximately 1 $\mu$m, which is the diffraction limit value, on the optical disk 1 by a fourth lens 10 through a half mirror 9. Recording and erasing are carried out by the spot 11.

In a reproducing operation, a photo-sensitive diode 13 detects a reflection light from the optical disk 1 through the half mirror 9 and the lens 12.

Figure 2B:
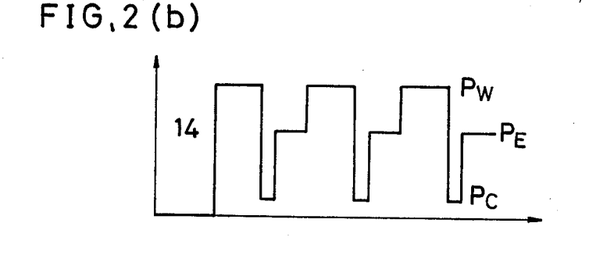
FIG. 2(b) is a wave form chart of inputted current to the laser diode.

The methd for optical information recording in accordance with the present invention is characterized mainly by an output wave form of laser light intensity which is modulated in a special manner and is irradiated onto the optical disk 1. The output wave form is controlled by current of wave form 14 (FIG. 2(b)) inputted to the laser diode 4.

Figure 1A:
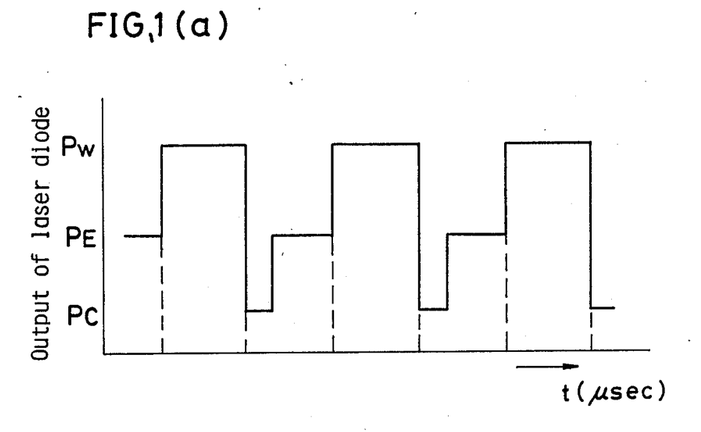
FIG. 1(a) is a wave form chart of output of laser diode used in the present invention.
Figure 1B:
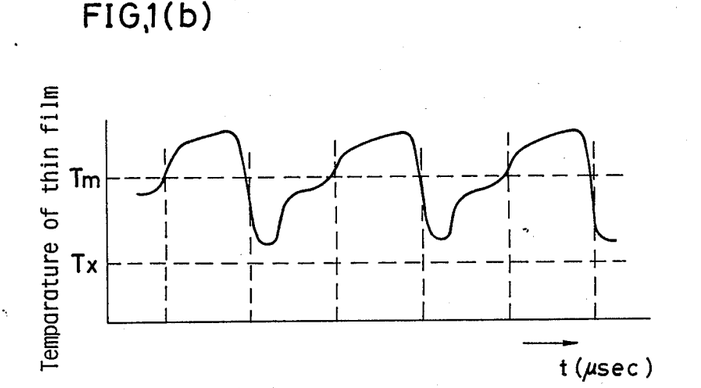
FIG. 1(b) is a diagram of temperature distribution along a track of recording film.
Figure 1C:
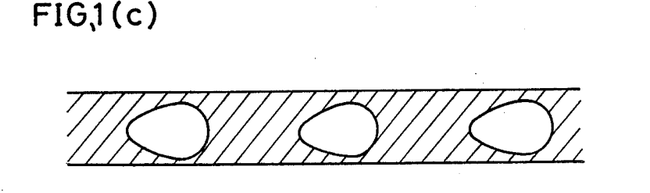
FIG. 1(c) is a figure for showing the bits recorded on the recording track.

FIG. 1(a) shows the output wave form of the laser diode intensity modulated by the current of wave form 14. FIG. 1(b) shows a distribution diagram of temperature of the recording film which is irradiated by the laser light in accordance with FIG. 1(a). FIG. 1(c) shows a recording bit on a track of the optical disk. As shown in FIG. 1(a), power level of the laser light is modulated to have three power levels, i.e., a recording power level PW, an erasing power level PE which is lower than the recording power level PW, and a cooling power level PC which is lower than the erasing power level PE and irradiated instantaneously after the recording power level PW. The recording power level PW is selected such that by irradiating the selected power level PW the temperature of thin film rises to the melting temperature TM of the thin film. The erasing power level PE is selected such that by irradiating the selected power level PE the temperatures of thin film rises to the crystallization (blackened) temperature TX of the thin film. In general, the erasing power level PE is selected that by irradiating the selected power level PE the temperature of thin film is not raised to the melting temperature TM of the thin film, but in some case an erasing power level PE which causes higher temperature than the melting temperature TM may be used under the condition that the irradiated part finally is crystallized. When the film is fast cooled after perfectly melted by irradiation of the recording power level PW for raising temperature of thin film enough above the melting temperature TM, the irradiated part finally becomes amorphous. However, when the film is cooled after melting by irradiation of the erasing power level PE for raising the temperature of thin film slightly above the melting temperature TM, the irradiated part does not become amorphous but becomes crystalline in some cases. This is thought that the states are determined by becoming crystal, or becoming amorphous by melting state (i.e., perfectly melted, or partially melted including crystallization nucleus), and by the cooling condition thereafter.

The cooling power level PC is smaller than the erasing level PE for quenching the recording part irradiated by the recording power level PW. Introduction of the cooling power level PC, that does not exist in the prior art single beam rewrite method, is the main feature of the present invention. Long time irradiation by the cooling power level PC often causes an undesirable residual signal. However, when the irradiating time of the cooling power level PC is very short, the temperature of the irradiated part rises by overlapping irradiation of foregoing PW and following PE, and by conduction of heat from the parts irradiated by the powers PW and PE; and thus the temperature above the crystallization temperature TX is obtainable even PC=0. In fact, there is substantially no residual signal observed even in the case of PC=0 (detail will be described in examples below).

Irradiating time $\tau$ of cooling power level PC is preferably;

$$0 < \tau < \lambda/V$$

wherein
$\lambda$: wavelength of laser light
V: relative speed between laser spot and disk.

Since PC is smaller than PE, long time irradiation of PC causes an imperfect rise of temperature for crystallization and causes a residual signal. However, when the irradiation time of PC is in a range to satisfy the above inequality, the large residual signal does not exist (detail will be described in examples below). This is because in case of PC within above inequality, the temperature of irradiated part by PC rises above the crystallization temperature TX by overlapping irradiation of PW and PE and by conduction of heat from the parts irradiated by PW and PE.

The recorded bit on the track is not in an exact oval form, but rather in an egg-shape as shown in FIG. 1(c). It is thought that this is because the power level downs into PC immediately after irradiation by PW, and thus more quenching condition is obtained in latter half of the part irradiated by PW.

In the phase change type optical disk, the condition of the crystallization and making amorphous can be controlled by changing composition of recording thin film and its composition rate, disk structure, power of irradiated laser light, relative speed between the laser spot and the optical disk. The inventors discovered that in a predetermined condition, the recording thin film is crystallized by continuously irradiating the laser light for melting the thin film but the last end part at stopping of laser light of the thin film becomes an amorphous phase. It is thought that the cause is that in the part continuously irradiated by the laser light the heat escapes only in vertical direction to track and thus the part is crystallized causing by slow cooling speed, but at the end part the heat escapes also in running direction of laser spot and thus the part becomes amorphous by quenching.

By utilizing this principle, method for single beam overwrite is provided. When erasing the old signal, the part to be erased is continuously irradiated by the laser light for melting the recording film. When recording the new signal, the part to be recorded is partially irradiated by the laser light where the laser light is lowered (it may be zero) at a moment. In other words, the amorphous bit is formed only at the end of the irradiated part, and thereby the signal is recorded.

This method is corresponding to the case that the erasing power level PE is increased with the recording power level PW in the single beam overwrite method where the modulation is carried out by the three power levels i.e., the erasing power level PE, the recording power level PW and the cooling power level PC. Therefore, the cooling power level may be selected in accordance with the single beam overwrite method as above-mentioned.

Figure 3B:
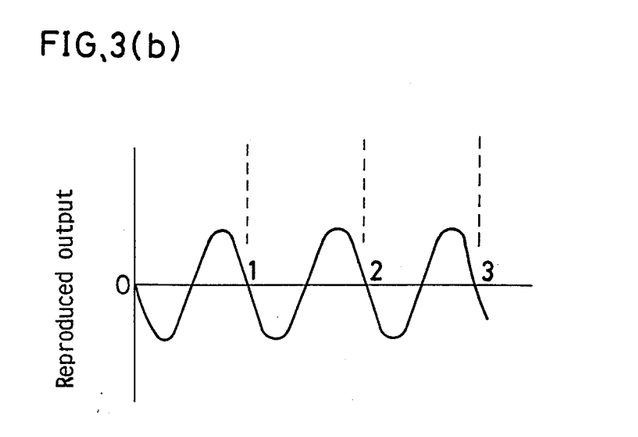
FIG. 3(b) is a wave form chart of reproduced output signal in the prior art.

The reproduced wave form from the optical information recording method is described hereafter, comparing with the prior art method (FIGS. 3(a) & 3(b)).

The optical disk used for comparison sample has a 1000 Å recording thin film ($Te_{50}Se_{30}Au_{20}$) formed by vapor evaporation method on the PMMA substrate, and another PMMA sheet is bonded on the opposite face of the PMMA substrate as a back-coat. The thin film of $Te_{50}Se_{30}Au_{20}$ can be used for the single beam overwrite method because its crystallization speed is fast. Since temperature of recording thin film rises high at laser irradiation, the recording thin film is put between a pair of $SiO_2$ film of 1000 Å for the substrate protection.

The moving velocity (linear velocity) V of laser spot on the track is 4 m/sec.

FIG. 3(a) shows a form of irradiated laser light in accordance with the prior art method. The recording power level PW is 6 mW (on the optical disk). The erasing power level PE is 3 mW. Irradiating time of each power level is 0.5 $\mu$second (recording frequency is 1 MHz). FIG. 3(b) shows a reproducing wave from the the recorded signal in accordance with prior art method.

Figure 4A:
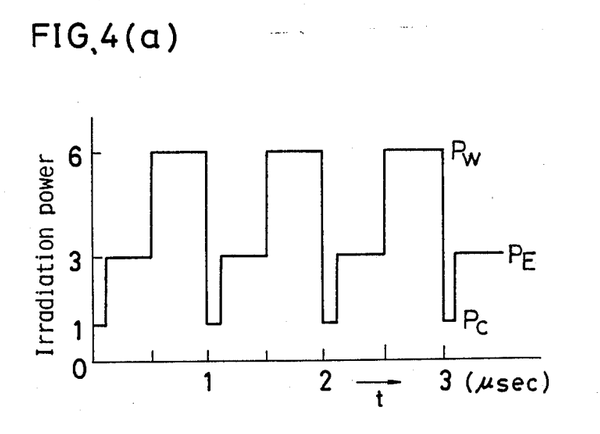
FIG. 4(a) is a wave form chart of output of laser diode used in a first embodiment of the present invention.
Figure 4B:
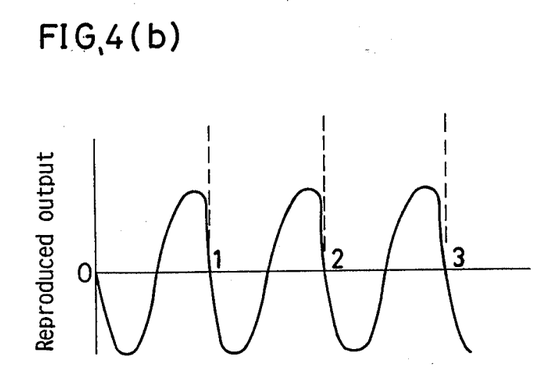
FIG. 4(b) is a wave form chart of reproduced output signal in a first embodiment of the present invention.

FIG. 4(a) shows a wave form of irradiated laser light in accordance with the present invention. The recording power level PW is 6 mW. The erasing power level PE is 3 mW. The cooling power level PC is 1 mW. Respective irradiating times are 0.5 $\mu$second (for PW), 0.4 $\mu$second (for PE) and 0.1 $\mu$second (for PC), respectively. FIG. 4(b) shos a reproducing wave form from the recorded signal in accordance with the present invention.

As is obvious from comparison of the reproduced signals of FIG. 3(b) and FIG. 4(b), larger signal amplitude than the prior art is obtained in the present invention, and thus the large output signal is obtained in the present invention. It is thought that larger recording bit is formed in the present invention than the prior art because the cooling speed immediately after irradiating PW is fast on the present invention.

In FIGS. 3(b) and 4(b), carrier to noise ratios (C/N) are 46 dB and 50 dB, respectively.

Effective cooling power level was examined as described hereafter.

Figure 5A:
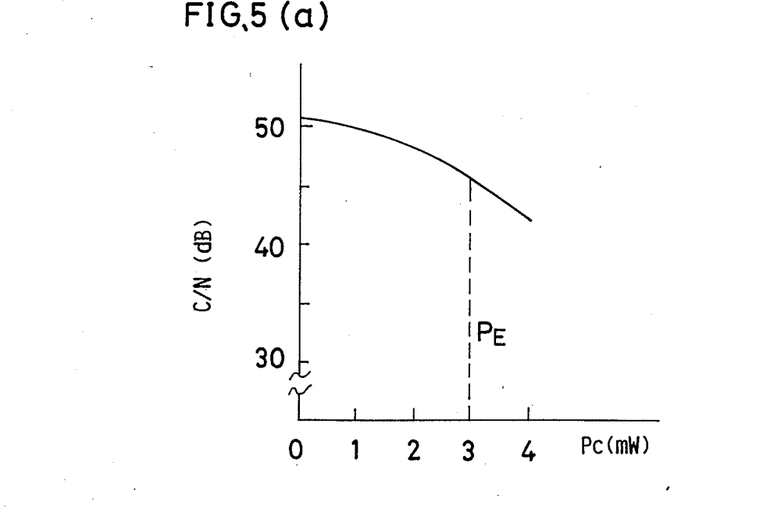
FIG. 5(a) is a graph for showing a relation between C/N and a cooling power level PC.
Figure 5B:
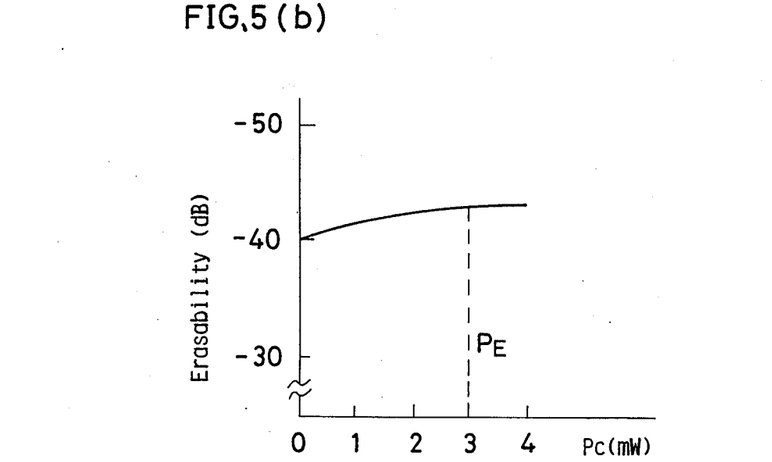
FIG. 5(b) is a graph for showing a relation between an erasability and the cooling power level PC.

The same optical disk as described above was used and an experimentation is carried out under the same condition as in FIG. 4(a), and therein only the cooling power level PC is varied. In the experimentation, signal of 1.5 MHz has been previously recorded, and then signal of 1 MHz is recorded with varying the power level PC by the single beam overwrite method. FIG. 5(a) shows relation between the cooling power level PC and the reproduced signal from newly recorded signal of 1 MHz; and FIG. 5(b) shows relation between the cooling power level PC and the erasability of erased signal of 1.5 MHz. As shown in FIG. 5(a), C/N becomes large when the cooling power level PC is smaller than the erasing power level PE. As shown in FIG. 5(b), the erasability is reduced slightly when the cooling power level PC is decreased. However, the reduction of the cooling power level PC is only 3 dB even when PC=0. Therefore, the effect of the cooling power level PC is confirmed when it is smaller than the erasing power level PE.

When PC=0, the laser light may be modulated to have two levels, the erasing power level PE and recording power level PW, and thus the power control of the laser becomes simple.

Effective irradiation time was examined as described hereafter.

Figure 6A:
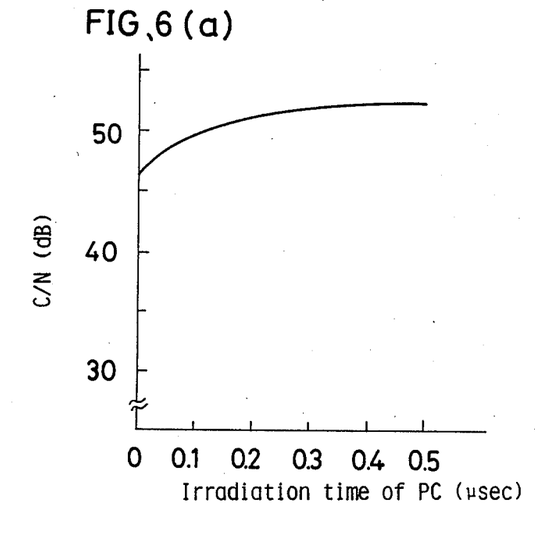
FIG. 6(a) is a growth for showing a relation between C/N and a irradiation time of the cooling power level PC.
Figure 6B:
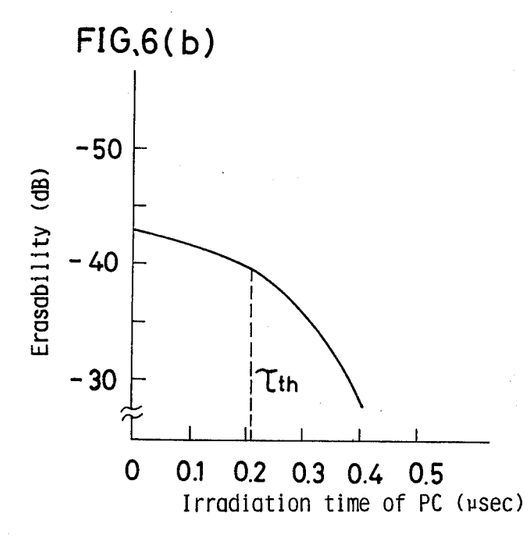
FIG. 6(b) is a graph for showing a relation between an erasability and the irradiation time of the cooling power level PC.

The same optical disk as described above was used and experimentation is carried out under the same condition as in FIG. 4(a). Only the irradiation time of the cooling power level PC is varied. In the experimentation, signal of 1.5 MHz has been previously recorded, and then signal of 1 MHz is recorded with varying the irradiation time of the power level PC by the single beam overwrite method. FIG. 6(a) shows relation between the irradiation time of the cooling power level PC and the reproduced signal from newly recorded signal of 1 MHz; and FIG. 6(b) shows relation between the irradiation time of the cooling power level PC and the erasability of erased signal of 1.5 MHz. As shown in FIG. 6(a), C/N becomes large as a result of introduction of the cooling power level PC. C/N increases in accordance with the irradiation time of the cooling power level PC. However, the erasability decreases with increase of the irradiation time of PC, as shown in FIG. 6(b). It is thought that too long time of the cooling power level PC causes to disturb necessary temperature rise of the irradiated part, and therefore, the amorphous bit does not crystallize perfectly. It is observed that when the irradiation time of the cooling power level PC becomes long, the erasability rapidly falls at a time $\tau_{th}$. Such irradiation time $\tau_{th}$ is in substantially inverse proportion to the relative speed V between the disk and the laser spot. For example, the irradiation time $\tau_{th}$ are 0.2 $\mu$second in 4 m/s of relative speed V, 0.1 $\mu$second in 8 m/s of V, 0.07 $\mu$second in 12 m/s of V.

From the above, it is shown that the temperature of the irradiation part of PC is must be raised by the foregoing PW and the following PE. The relation between $\sigma_{th}$ and V was experimentally confirmed to have the following relation:

$$\tau_{th} \approx \lambda/V$$

where $\lambda$: wavelength of laser light, and
V: relative speed between laser spot and disk.
Therefore, from FIGS. 6(a) and 6(b) suitable irradiation time $\tau$ of cooling power level PC is given as follows:

$$0 < \tau < \lambda/V.$$

In the following is described the single beam overwrite method embodying the present invention wherein the erasing power level PE is raised to the recording power level PW and the laser light is modulated to have two levels, in comparison with the prior art. Used optical disk has the same construction as above experimentation, but the composition of the recording film is $Te_{50}Se_{15}Au_{35}$. The recording film of $Te_{50}Se_{15}Au_{35}$ has faster crystallization speed than the recording film of $Te_{50}Se_{30}Au_{20}$, which has been afore-mentioned. Therefore, the recording film is crystallized when laser light is continuously irradiated on the film with power level which can melt the film (where the linear velocity of the optical disk is 4 m/s). However, in the end of continuously irradiated part at which the laser light is off, the amorphous region is formed, because the cooling speed of this region is fast.

Figure 7A:
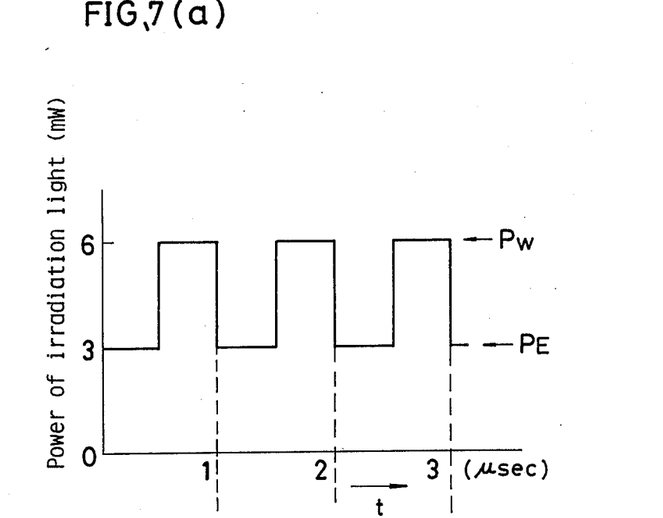
FIG. 7(a) is a wave form chart of output of laser diode used in the prior art.
Figure 7B:
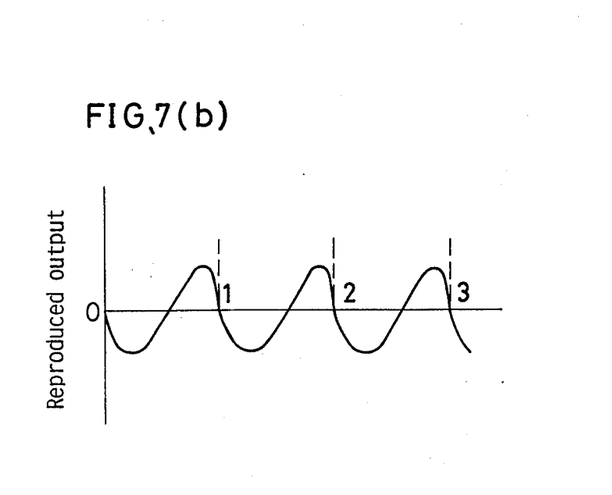
FIG. 7(b) is a wave form chart of reproduced output signal in the prior art.

FIG. 7(a) shows wave form of laser light in the prior art. The recording power level PW is 6 mW (on the optical disk), the erasing power level PE is 3 mW and irradiation time is 0.5 $\mu$second (in both level). The recording frequency is 1 MHz. FIG. 7(b) shows wave form of reproduced signal in the prior art.

Figure 8A:
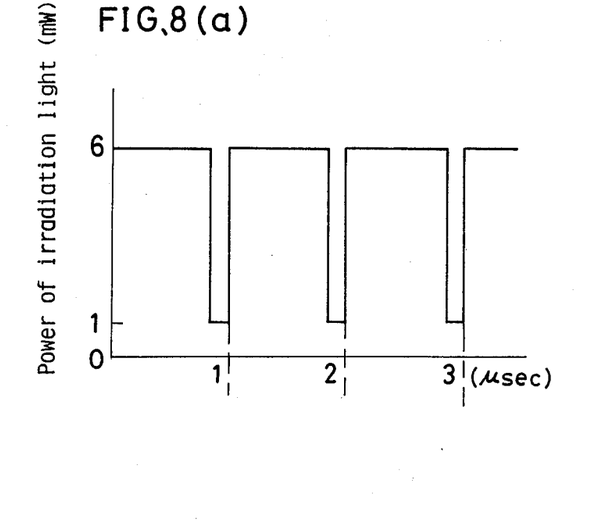
FIG. 8(a) is a wave form chart of output of laser diode used in a second embodiment of the present invention.
Figure 8B:
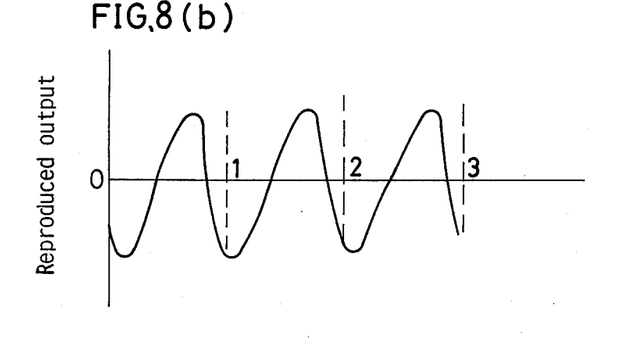
FIG. 8(b) is a wave form chart of reproduced output signal in a second embodiment of the present invention.

FIG. 8(a) shows wave form of laser light in this embodiment. The erasing power level PE is 6 mW, the cooling power level PC is 1 mW, the irradiation time of PE for erasing is 0.85 $\mu$second and the irradiation time of PC for cooling is 0.15 $\mu$second. In this embodiment, the recording power level and the erasing power level are called the erasing power level PE together, since the level PW is the same as the level PE. FIG. 8(b) shows wave form of reproduced signal in this embodiment.

In comparison with the reproduced wave forms of FIGS. 7(b) and 8(b), the signal amplitude is larger than the prior art and thus large output signal is obtained in the present invention. It is thought that the large recording bit is formed in the present invention, since the cooling speed after irradiation of PE in the present invention is faster than prior art.

In FIG. 7(b), C/N is 43 dB and in FIG. 8(b), C/N is 48 dB.

The effect of the cooling power level PC is larger, than the cooling power level PC is lower. The reproduced amplitude becomes maximum of PC=0. Setting of power level becomes simple at PC=0, since the laser light is modulated to have two levels, i.e., zero level and level PE. When the cooling power level PC is increased from zero, the cooling effect becomes smaller and the reproduced amplitude is rapidly decreased at the level PX. The level PX corresponds with power level wherein the recording film is crystallized at continuous irradiation. In this embodiment, the level PX is about 2.5 mW. Therefore, the cooling power level PC should be set in lower power level wherein the recording film is not crystallized at continuous irradiation.

Suitable irradiation time $\tau$ of cooling power level is same as the first embodiment wherein the laser light is modulated to have three levels.

As has been described in detail for various embodiments, the single beam overwrite method in accordance with the present invention gives large amplitude of reproduced signal, even in the optical disk having the recording film of fast speed crystallization characteristic. Furthermore, the optical head and other system structure can be made simple, since the present invention is achieved by one laser diode.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for erasing and recording information on an optical recording member of the type wherein a new signal is overwritten on a previously recorded track by means of a single laser spot passing only once on said previously recorded track in said optical recording member, comprising the steps of:
    modulating a recording laser power to a recording power level (PW);
    maintaining said laser power at said recording power level (PW) for a time corresponding to data to be recorded;
    lowering said laser power to a cooling power level (PC) which is lower than said recording power level (PW); and
    maintaining said laser power at said cooling power level (PC) for a predetermined period, to thereby record information.

2. A method as in claim 1, comprising the further step of raising said laser power to an erasing power level (PE), PC<PE<PW, and maintaining said laser power at said erasing level until data is to be recorded.

3. The method in accordance with claim 2, comprising the further step of erasing and recording said optical recording member by reversibly changing said material between an amorphous phase and a crystal phase.

4. The method in accordance with claim 2, wherein said cooling power level is a laser-off level.

5. The method in accordance with claim 2, wherein said predetermined period for laser irradiation with said low power level $\tau$ is $$0 < \tau < (\text{lambda})/V$$

where:
    (lambda) is the wavelength of the laser, and
    V: relative speed between the laser spot and the optical recording member.

6. The method in accordance with claim 1, wherein an erasing power level of said laser spot is substantially the same as said recording power level and comprising the further steps of:
    erasing a previously recorded signal by continuous irradiation of said laser spot with said erasing power and melting the recording film, and
    recording by decreasing the laser power to a low power level and quenching the end of the melted part obtained by a continuous irradiation of said laser spot with said erasing power.

7. The method in accordance with claim 6 wherein said low power level is a laser off level.

8. A method for erasing and recording information on an optical recording member having a thin recording film capable of reversibly changing between two optically distinguishable phases A and B, comprising the steps of: overwriting a new signal on a previously recorded track by means of a single laser spot passing only once on said previously recorded track in said optical recording member, said single laser spot having three power levels: (1) a recording power level (PW), (2) an erasing power level (PE) and (3) a cooling power level (PC), which power levels have the relation that power level of said PW>power level of said PE>power level of said PC, to record one signal in the form of said phase A and to record another signal in the form of said phase B:
    forming said phase A by keeping said power level at said recording power level (PW) for a time corresponding to data to be recorded and then lowering said power level to said low power level (PC) and keeping said power level thereat for a predetermined period; and
    forming said phase B by keeping said power level at said erasing power level (PE) for another time corresponding to data to be recorded.

9. The method in accordance with claim 8, wherein said phase A and phase B are an amorphous phase and crystal phase, and a material of said member is reversibly changeable between said phases.

10. The method in accordance with claim 8, wherein said low power level is a laser-off level.

11. The method in accordance with claim 8, wherein erasure of said previously recorded signal is done by continuous irradiation of said laser spot with said erasing power and whereby melting the recording film, and
    recording is done by decreasing the laser power to said low power level and whereby quenching the end of the melted part obtained by the continuous irradiation of said laser spot with said erasing power.

12. The method in accordance with claim 11, wherein said lower power level is a laser-off level.

13. The method in accordance with claim 15, wherein said predetermined period for laser irradiation with said low power level $\tau$ is $$0 < \tau < (\text{lambda})/V$$

where
    (lambda) is the wavelength of the laser
    V: relative speed between the laser spot and the optical recording member.

14. An apparatus for erasing and recording information on an optical recording member of the type wherein a new signal is overwritten on a previously recorded track by means of a single laser spot passing only once on said previously recorded track in said optical recording member comprising:
    a variable power laser;
    means for modulating a recording laser power to a recording power level (PW) and maintaining said laser power at said recording power level (PW) for a time corresponding to data to be recorded, lowering said laser power to a cooling power level (PC) which is lower than said recording power level (PW); and maintaining said laser power at said cooling power level (PC) for a predetermined period to record information.

15. An apparatus as in claim 14, wherein said modulating means includes means for raising said laser power to an erasing power level (PE), PC<PE<PW, and maintaining said laser power at said erasing level until data is to be recorded.

* * * * *